(12) United States Patent
Feng et al.

(10) Patent No.: US 10,899,055 B2
(45) Date of Patent: Jan. 26, 2021

(54) VALVE PIN AND NOZZLE CONFIGURATION AND METHOD OF CONTROL

(71) Applicant: Synventive Molding Solutions, Inc., Peabody, MA (US)

(72) Inventors: Ling Feng, Jiangsu (CN); Li Liqiao, Jiangsu (CN); William Henderson, Jiangsu (CN); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 513 days.

(21) Appl. No.: 15/181,933

(22) Filed: Jun. 14, 2016

(65) Prior Publication Data

US 2016/0288388 A1 Oct. 6, 2016

Related U.S. Application Data

(63) Continuation of application No. PCT/US2015/010270, filed on Jan. 6, 2015.
(Continued)

(51) Int. Cl.
*B29C 45/27* (2006.01)
*B29C 45/03* (2006.01)
(Continued)

(52) U.S. Cl.
CPC ............ *B29C 45/278* (2013.01); *B29C 45/27* (2013.01); *B29C 45/2806* (2013.01);
(Continued)

(58) Field of Classification Search
CPC ............. B29C 45/2708; B29C 45/2711; B29C 2045/2761; B29C 2045/272;
(Continued)

(56) References Cited

U.S. PATENT DOCUMENTS 3,741,704 A * 6/1973 Beasley .................. B29C 45/27
425/550
5,470,219 A * 11/1995 Yokoyama .......... B29C 45/2737
264/328.15
(Continued)

FOREIGN PATENT DOCUMENTS

WO 2012097452 A1 1/2012
WO 2012151269 A1 5/2012

OTHER PUBLICATIONS

Int'l. Search Report and Written Opinion dated Mar. 19, 2015 in corresponding Int'l. Application PCT/US2015/010270.
(Continued)

*Primary Examiner* — James P Mackey
*Assistant Examiner* — Emmanuel S Luk
(74) *Attorney, Agent, or Firm* — Polsinelli, PC (57) ABSTRACT

An injection molding apparatus comprising: a manifold, a nozzle, A distal tip of the nozzle being comprised of a highly heat conductive insert and an insulation cap that is substantially less heat conductive than the insert, the downstream end portion of the insulation cap being disposed between the gate and the downstream end portion of the highly heat conductive insert forming a fluid seal around the gate, a valve pin, wherein when the valve pin is in a gate closed position, an axially interior surface of a fluid exit aperture of the insulation cap surrounds a gap enabling circumferential surface of the valve pin forming a spatial gap immediately upstream of the gate between the interior surface of the fluid exit aperture of the insulation cap and the gap enabling circumferential surface of the valve pin.

10 Claims, 4 Drawing Sheets

Related U.S. Application Data (60) Provisional application No. 61/924,988, filed on Jan. 8, 2014.

(51) Int. Cl.
*B29C 45/76* (2006.01)
*B29C 45/28* (2006.01)

(52) U.S. Cl.
CPC .......... *B29C 45/03* (2013.01); *B29C 45/7613* (2013.01); *B29C 2045/2761* (2013.01); *B29C 2045/2767* (2013.01); *B29C 2045/2787* (2013.01); *B29C 2045/2879* (2013.01); *B29C 2945/76568* (2013.01)

(58) Field of Classification Search
CPC .......... B29C 45/278; B29C 2045/2787; B29C 45/23; B29C 45/27; B29C 45/2806; B29C 2045/2764; B29C 2045/2759; B29C 45/03; B29C 45/7613; B29C 2045/2767; B29C 2045/2879; B29C 2945/76568
See application file for complete search history.

(56) References Cited

U.S. PATENT DOCUMENTS

| | | | | |
|---|---|---|---|---|
| 5,695,793 A * | 12/1997 | Bauer | ................ | B29C 45/2806 |
| | | | | 264/328.9 |
| 6,135,757 A * | 10/2000 | Jenko | ................ | B29C 45/2708 |
| | | | | 425/562 |
| 6,220,850 B1 * | 4/2001 | Catoen | ................ | B29C 45/2711 |
| | | | | 264/328.16 |
| 6,254,377 B1 * | 7/2001 | Kazmer | ................ | B29C 45/2806 |
| | | | | 425/562 |
| 6,273,706 B1 * | 8/2001 | Gunther | ................ | B29C 45/2806 |
| | | | | 425/564 |
| 6,287,107 B1 * | 9/2001 | Kazmer | ................ | B29C 45/1603 |
| | | | | 425/562 |
| 6,294,122 B1 * | 9/2001 | Moss | ................ | B29C 45/2806 |
| | | | | 264/328.9 |
| 6,309,208 B1 * | 10/2001 | Kazmer | ................ | B29C 45/1603 |
| | | | | 425/562 |
| 6,464,909 B1 * | 10/2002 | Kazmer | ................ | B29C 45/2701 |
| | | | | 264/328.8 |
| 7,234,929 B2 * | 6/2007 | Vasapoli | ................ | B29C 45/2701 |
| | | | | 425/145 |
| 9,827,701 B2 * | 11/2017 | Galati | ................ | B29C 45/2806 |
| 2003/0008034 A1 * | 1/2003 | Niewels | ................ | B29C 45/2711 |
| | | | | 425/549 |
| 2003/0235638 A1 * | 12/2003 | Gellert | ................ | B29C 45/27 |
| | | | | 425/568 |
| 2004/0208949 A1 * | 10/2004 | Niewels | ................ | B29C 45/2711 |
| | | | | 425/549 |
| 2006/0251759 A1 * | 11/2006 | Gunther | ................ | B29C 45/2806 |
| | | | | 425/568 |
| 2008/0268088 A1 * | 10/2008 | Kmoch | ................ | B29C 45/2711 |
| | | | | 425/547 |
| 2010/0092601 A1 * | 4/2010 | Klobucar | ................ | B29C 45/278 |
| | | | | 425/548 |
| 2012/0045537 A1 | 2/2012 | Favata et al. | | |
| 2013/0287889 A1 * | 10/2013 | Hammond | ................ | B29C 45/278 |
| | | | | 425/568 |
| 2015/0110918 A1 * | 4/2015 | Dezon-Gaillard | ...... | B29C 45/27 |
| | | | | 425/564 |
| 2017/0334115 A1 * | 11/2017 | Bernier | ................ | B29C 45/278 |

OTHER PUBLICATIONS

Written Opinion dated Dec. 16, 2015 in corresponding Int'l. Application PCT/US2015/010270.

Int'l. Preliminary Report on Patentability dated Mar. 30, 2016 in corresponding Int'l. Application PCT/US2015/010270.

* cited by examiner

Fig. 1

PRIOR ART

VALVE PIN AND NOZZLE CONFIGURATION AND METHOD OF CONTROL

RELATED APPLICATIONS

This application is a continuation of and claims the benefit of priority to PCT/US2015/010270 filed Jan. 8, 2015 which in turn claims the benefit of priority to U.S. provisional application Ser. No. 61/924,998 filed Jan. 8, 2014.

The disclosures of all of the following are incorporated by reference in their entirety as if fully set forth herein: International Application Publication No. WO2012/074879, U.S. Patent Application Publication No. 2012/0248644, International Application Publication No. 2012/087491, U.S. Patent Application Publication No. 2012/0248652, U.S. Pat. Nos. 5,894,025, 6,062,840, 6,294,122, 6,309,208, 6,287,107, 6,343,921, 6,343,922, 6,254,377, 6,261,075, 6,361,300 (7006), 6,419,870, 6,464,909 (7031), 6,599,116, 7,234,929 (7075US1), 7,419,625 (7075US2), 7,569,169 (7075US3), U.S. patent application Ser. No. 10/214,118, filed Aug. 8, 2002 (7006), U.S. Pat. Nos. 7,029,268 (7077US1), 7,270,537 (7077US2), 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070), U.S. application Ser. No. 13/484,366 filed May 31, 2012 (7100US1) and U.S. application Ser. No. 13/484,408 filed May 31, 2012 (7100US3).

BACKGROUND OF THE INVENTION

Injection molding systems using valve pins having cylindrical or conical geometries have been used in injection molding systems where withdrawal and closure of the pins have been controlled in an attempt to reduce vestiges on parts produced.

SUMMARY OF THE INVENTION

In accordance with the invention and with reference to FIGS. 2-5, there is provided an injection molding apparatus 10 comprising:

a manifold 30 having a manifold channel 35 that receives an injection fluid 32, a nozzle 50 having a nozzle channel 54 having an axis A receiving the injection fluid from the manifold channel 35, the nozzle having a distal tip in fluid communication with a gate 85 to a mold cavity 80, the distal tip of the nozzle 50 being comprised of a highly heat conductive insert 55 and an insulation cap 64 that is substantially less heat conductive than the insert 55, mounted coaxially within the nozzle channel 54 in nested contact with each other, the highly heat conductive insert 55 and the insulation cap 60 each having a downstream end portion containing a fluid exit aperture 55e, 64 that are aligned with each other enabling flow of injection fluid 32 through the nozzle channel 54 downstream into the mold cavity 80, the downstream end portion of the insulation cap 60 being disposed between the gate 85 and the downstream end portion of the highly heat conductive insert 55 forming a fluid seal (S) around the gate 85, a valve pin 90 interconnected to an actuator 941 adapted for controllably driven reciprocal movement of the valve pin coaxially A through the nozzle flow channel 54, the valve pin 90 having a distal end portion 90de having a downstream-most circumferential surface 99 complementary to an axially interior surface 76s of the gate 85 and a downstream surface portion 92, 97 immediately upstream of the downstream-most circumferential surface 99, the downstream surface portion 92, 97 having a gap enabling circumferential surface 92 around the circumference of a bulbous portion 90p of the valve pin, the actuator 941 being adapted to controllably drive the distal end portion of the valve pin 90de along a drive path extending between one or more upstream positions (P1, P2, P3) where the injection fluid flows through the gate 85 and a downstream gate closed position P4 where the distal end portion 90de of the valve pin 90 mates with the axially interior surface 76s of the gate 85 to stop flow of injection fluid through the gate, Preferably, when the valve pin 90 is in the gate closed position (P4), an axially interior surface 64s of the fluid exit aperture 64 of the insulation cap 60 surrounds the gap enabling circumferential surface 92 of the valve pin forming a spatial gap 60g immediately upstream of the gate 85 between the interior surface 64s of the fluid exit aperture 64 of the insulation cap 60 and the gap enabling circumferential surface 92 of the valve pin 90.

The actuator can be interconnected to a controller (16) that controllably instructs the actuator (941) to drive the distal end portion (90d, 97) of the valve pin continuously upstream starting from the gate closed position (P4) at one or more intermediate upstream velocities that are less than a predetermined high velocity and to subsequently further drive the valve pin upstream at the predetermined high velocity.

Preferably the actuator comprises a hydraulically driven or pneumatically driven actuator. The actuator can comprise an electrically powered motor.

The spatial gap is typically adapted to receive injection fluid that is forced upstream from the gate when the valve pin is moved downstream toward the gate closed position.

The axially interior surface of the gate typically comprises a surface of the mold.

The nozzle channel can have an axially interior surface disposed upstream of the fluid exit apertures that is complementary to and slidably engages with the gap enabling circumferential surface of the valve pin to align the axis of the valve pin with the gate during downstream movement of the valve pin toward the gate closed position.

An axially inner surface of an upstream end portion of the insulation cap is typically engaged against an axially outer surface of a downstream end of the insert, the upstream end portion of the insulation cap being compressed between the insert and an axially inner surface of the distal tip of the nozzle to seal flow of the injection fluid to within the nozzle channel.

The distal end portion of the valve pin is preferably configured such that flow of injection fluid through the gate is restricted at one or more positions of the valve pin that are intermediate the gate closed position and a fully upstream gate open position at which flow of the injection fluid is unrestricted.

In another aspect of the invention there is provided a method of performing an injection molding cycle comprising injecting the injection fluid (32) from an injection molding machine (20) into the manifold channel (35) of the apparatus (10) described immediately above and using the apparatus (10) to inject the injection fluid (32) into the mold cavity (80) during the course of an injection molding cycle.

In another aspect of the invention there is provided with reference to FIGS. 2-5, an injection molding apparatus (10) comprising:

a manifold (30) having a manifold channel (35) receiving an injection fluid (32), a nozzle (50) having a nozzle channel (54) receiving injection fluid (32) from the manifold channel (35), the nozzle having a distal tip in fluid communication with a gate (85) to a cavity (80) of a mold (88), the distal tip being comprised of a highly heat conductive insert (55) mounted in contact with an insulation cap (60) that is mounted between the insert and the gate, the insulation cap being substantially less heat conductive than the insert, the insulation cap (60) forming a fluid seal (S) around the gate (85) such that a fluid sealed flow channel (54) is formed extending from an upstream end of the nozzle (50) to the gate (85), a valve pin (90) having a distal end portion (90de) having a circumferential surface (97, 99), and a distal tip end (90d), an actuator (941) drivably interconnected to the valve pin adapted to drive the valve pin (90) along a drive path extending between a gate closed position (P4), one or more intermediate upstream positions (P3) where the distal tip end of the valve pin restricts (FG) flow (32r) of the injection fluid through the gate (85) and a third position (P1, P2) upstream of the intermediate upstream positions (P3) where the injection fluid (32) flows freely through the gate without restriction, wherein when the valve pin (90) is in the gate closed position (P4), the distal tip end (90d) of the valve pin (90) seals the gate (85) and a downstream circumferential surface (97, 99) of the distal end portion (90de) of the valve pin mates with a complementary axially interior surface (76s, 88cs) of the gate (85), and, wherein the insulation cap (60) is configured to form a circumferential gap (60g) around an upstream circumferential surface (92) of a bulbous protrusion (90p) of the distal end portion (90de) of the valve pin that is disposed immediately upstream of the complementary axially interior surface (76s, 88cs) of the gate (85) when the valve pin is in the gate closed position (P4).

In such an apparatus as just described, the complementary internal surface of the gate can comprise a surface of the mold (88).

The upstream circumferential surface of the distal end portion of the valve pin preferably slidably engages with an axially interior surface of the nozzle flow channel to align the axis of the pin with the gate during downstream movement of the pin toward the gate closed position.

The actuator can comprise a hydraulically driven or pneumatically driven actuator or an electrically powered motor.

The actuator is typically interconnected to a controller that controllably instructs the actuator to drive the distal end portion of the valve pin continuously upstream starting from the gate closed position at one or more intermediate upstream velocities that are less than a predetermined high velocity and to subsequently further drive the valve pin upstream at the predetermined high velocity.

In another aspect of the invention there is provided a method of performing an injection molding cycle comprising injecting the injection fluid from an injection molding machine (10) into the manifold channel of the apparatus described above and using such an apparatus to inject the injection fluid into the mold cavity during the course of the injection molding cycle.

In another aspect of the invention there is provided an injection molding system an injection molding system comprising:

a manifold having a melt channel receiving a melt stream of injection fluid, a nozzle having a melt channel receiving injection fluid from the manifold melt channel, the nozzle having a distal tip in fluid communication with a gate to a cavity of a mold, the distal tip being comprised of a highly heat conductive insert mounted in contact with an insulation cap that is mounted in compressed contact with the gate, the insulation cap being substantially less heat conductive than the insert, the insulation cap forming a fluid seal around the gate such that a fluid sealed flow channel is formed extending from an upstream end of the nozzle to the gate, a valve pin having a circumferential surface and an axis mounted and adapted for controllably driven reciprocal movement of the valve pin through the flow channel from a gate closed position to selectable upstream positions, the valve pin having a distal end portion having a circumferential surface geometry that conforms to a selected internal surface geometry of the flow channel and gate and having a distal tip end that is flat, an actuator drivably interconnected to the valve pin adapted to drive the distal tip end along a drive path extending between the gate closed position, one or more intermediate upstream positions where the distal tip end of the valve pin restricts flow of the injection fluid through the gate and a third position upstream of the intermediate upstream positions where the injection fluid flows freely through the gate without restriction, wherein when the valve pin is in the gate closed position, the distal tip end seals the gate and a secondary portion of the circumferential surface of the valve pin that is disposed immediately upstream of the distal tip end is in contact with a first internal surface of the flow channel surrounding the gate that is immediately downstream of the insulation cap.

The insulation cap is typically configured to form a circumferential gap around a portion of the circumferential surface of the pin that is disposed immediately upstream of the first internal surface of the flow channel when the secondary portion of circumferential surface of the valve pin is contact with the first internal surface of the flow channel.

The first internal channel surface surrounding the gate preferably comprises a surface of the mold.

The pin preferably has a tertiary portion of its circumferential surface that is upstream of the secondary portion that slidably engages with a second internal surface of the flow channel to align the axis of the pin with the gate during downstream movement of the pin toward the gate closed position.

The second internal surface of the flow channel is typically disposed immediately upstream of the insulation cap, the insulation cap being configured to form a circumferential gap around a portion of the circumferential surface of the pin that is disposed immediately upstream of the first internal surface of the flow channel when the secondary portion of the circumferential surface of the valve pin is contact with the first internal surface of the flow channel.

An inner surface of an upstream end portion of the insulation cap is preferably engaged against an outer surface of a downstream end of the insert, the upstream end portion of the insulation cap being compressed between the insert and an inner surface of the distal tip of the nozzle to seal flow of the injection fluid to within the flow channel.

The distal tip end of the valve pin can have an outer circumferential edge that is sharpened. Alternatively the distal tip end of the valve pin can have an outer circumferential edge that is rounded or curved.

The actuator can be hydraulic, pneumatic or electrically powered.

The actuator is preferably driven by a valve system that is controllably adjustable between a start position that positions the distal tip end of the valve pin in the gate closed position, one or more intermediate drive rate positions that drive the valve pin upstream from the gate closed position through one or more intermediate upstream positions at one or more corresponding intermediate velocities and a high drive rate position that drives the valve pin at a high velocity that is higher than the intermediate velocities.

In another aspect of the invention there is provided a method of performing an injection molding cycle comprising operating an injection molding system having a controllably adjustable actuator as described immediately above by:

preselecting a length of travel between the gate closed position and one or more selected intermediate upstream positions, beginning an injection cycle with the tip end of the valve pin in the gate closed position and the valve system in the start position, adjusting the valve system to operate at one or more of the intermediate drive rate positions to drive the tip end of the valve pin continuously upstream from the gate closed position to the one or more selected intermediate upstream positions, sensing the position of the valve pin to determine when the tip end of the valve pin has reached the one or more selected intermediate upstream positions, and, adjusting the valve system to operate at a selected high drive rate position to drive the distal tip end of the valve pin continuously upstream at a corresponding high velocity when the tip end of the valve pin has been determined in the step of sensing to have reached the selected one or more intermediate upstream positions.

In another aspect of the invention there is provided an injection molding system as described above wherein the actuator is driven by a valve system that is controllably adjustable between a first position that positions the distal tip end of the valve pin in a selected fully upstream position, one or more intermediate downstream drive rate positions that drive the valve pin downstream from the fully upstream position toward the gate to one or more intermediate downstream positions at one or more intermediate downstream velocities and one or more closure drive rate positions that drives the valve pin at one or more low velocities that are lower than the intermediate downstream velocities.

In another aspect of the invention there is provided a method of performing an injection molding cycle comprising operating an injection molding system as described immediately above by:

preselecting a length of travel between the selected fully upstream position and the one or more selected intermediate downstream positions, beginning a downstream drive portion of an injection cycle with the tip end of the valve pin in the selected fully upstream position and the valve system in the first position, adjusting the valve system to operate at one or more of the intermediate drive rate positions to drive the tip end of the valve pin continuously downstream from the selected fully upstream position toward the one or more selected intermediate downstream positions, sensing the position of the valve pin to determine when the tip end of the valve pin has reached one or more selected intermediate downstream positions, and, adjusting the valve system to operate at one or more selected closure rate positions to drive the distal tip end of the valve pin continuously downstream at a corresponding low velocity when the tip end of the valve pin has been determined in the step of sensing to have reached the selected one or more intermediate downstream positions.

In another aspect of the invention there is provided an injection molding system comprising:

a manifold having a melt channel receiving a melt stream of injection fluid, a nozzle having a melt channel receiving injection fluid from the manifold melt channel, the nozzle having a distal tip in fluid communication with a gate to a cavity of a mold, the distal tip being comprised of a highly heat conductive insert mounted in contact with the gate, a valve pin having a circumferential surface and an axis mounted and adapted for controllably driven reciprocal movement of the valve pin through the flow channel from a gate closed position to selectable upstream positions, the valve pin having a distal end portion having a circumferential surface geometry that conforms to a selected internal surface geometry of the flow channel and gate and having a distal tip end that is flat, an actuator drivably interconnected to the valve pin adapted to drive the distal tip end along a drive path extending between the gate closed position, one or more intermediate upstream positions where the distal tip end of the valve pin restricts flow of the injection fluid through the gate and a third position upstream of the intermediate upstream positions where the injection fluid flows freely through the gate without restriction, wherein when the valve pin is in the gate closed position, the distal tip end seals the gate and a secondary portion of the circumferential surface of the valve pin that is disposed immediately upstream of the distal tip end is in contact with a first internal surface of the flow channel surrounding the gate that is immediately upstream of the gate.

In such an apparatus the first internal surface of the flow channel can comprise a surface of the mold.

In such an apparatus the pin can have a tertiary portion of its circumferential surface that is upstream of the secondary portion that slidably engages with a second internal surface of the flow channel to align the axis of the pin with the gate during downstream movement of the pin toward the gate closed position.

In such an apparatus the distal tip end of the valve pin can have an outer circumferential edge that is sharpened. Alternatively the distal tip end of the valve pin can have an outer circumferential edge that is rounded or curved.

The actuator can be hydraulic, pneumatic or electrically powered.

In such an apparatus the actuator is driven by a valve system that is controllably adjustable between a start position that positions the distal tip end of the valve pin in the gate closed position, one or more intermediate drive rate positions that drive the valve pin upstream from the gate closed position through one or more intermediate upstream positions at one or more corresponding intermediate velocities and a high drive rate position that drives the valve pin at a high velocity that is higher than the intermediate velocities.

In another aspect of the invention there is provided, a method of performing an injection molding cycle comprising operating the injection molding system described immediately above by:

preselecting a length of travel between the gate closed position and one or more selected intermediate upstream positions, beginning an injection cycle with the tip end of the valve pin in the gate closed position and the valve system in the start position, adjusting the valve system to operate at one or more of the intermediate drive rate positions to drive the tip end of the valve pin continuously upstream from the gate closed position to the one or more selected intermediate upstream positions, sensing the position of the valve pin to determine when the tip end of the valve pin has reached the one or more selected intermediate upstream positions, and, adjusting the valve system to operate at a selected high drive rate position to drive the distal tip end of the valve pin continuously upstream at a corresponding high velocity when the tip end of the valve pin has been determined in the step of sensing to have reached the selected one or more intermediate upstream positions.

In such an apparatus the actuator can be driven by a valve system that is controllably adjustable between a first position that positions the distal tip end of the valve pin in a selected fully upstream position, one or more intermediate downstream drive rate positions that drive the valve pin downstream from the fully upstream position toward the gate to one or more intermediate downstream positions at one or more intermediate downstream velocities and one or more closure drive rate positions that drives the valve pin at one or more low velocities that are lower than the intermediate downstream velocities.

In another aspect of the invention there is provided a method of performing an injection molding cycle comprising operating an injection molding system as described immediately above by:

preselecting a length of travel between the selected fully upstream position and the one or more selected intermediate downstream positions, beginning a downstream drive portion of an injection cycle with the tip end of the valve pin in the selected fully upstream position and the valve system in the first position, adjusting the valve system to operate at one or more of the intermediate drive rate positions to drive the tip end of the valve pin continuously downstream from the selected fully upstream position toward the one or more selected intermediate downstream positions, sensing the position of the valve pin to determine when the tip end of the valve pin has reached one or more selected intermediate downstream positions, and, adjusting the valve system to operate at one or more selected closure rate positions to drive the distal tip end of the valve pin continuously downstream at a corresponding low velocity when the tip end of the valve pin has been determined in the step of sensing to have reached the selected one or more intermediate downstream positions.

BRIEF DESCRIPTION OF THE DRAWINGS

The above and further advantages of the invention may be better understood by referring to the following description in conjunction with the accompanying drawings in which.

DETAILED DESCRIPTION

Figure 1:
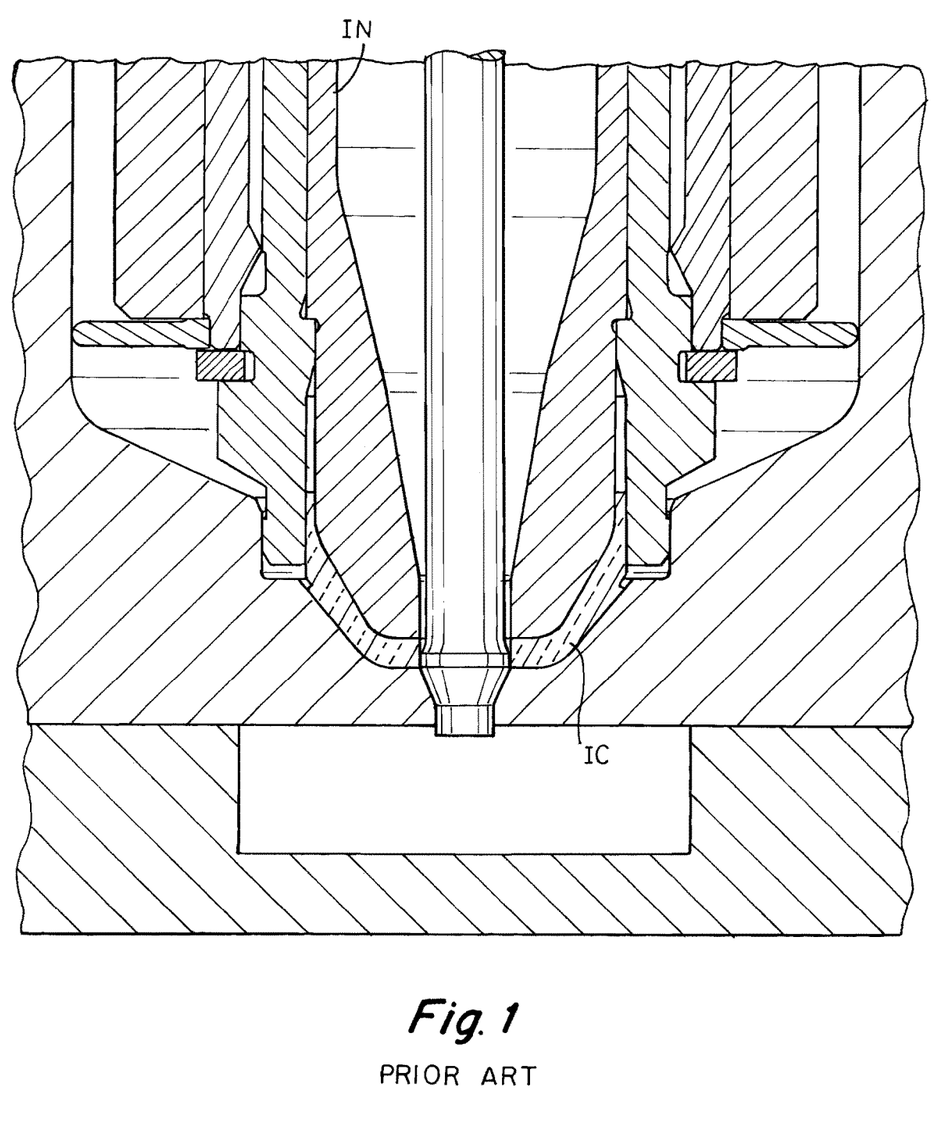
FIG. 1 is a side cross-sectional view of a prior art valve configuration having an insert IN and an insulation cap and a valve pin configuration where the distal tip end portion of the valve pin, when driven into the gate closed position as shown provides no relief or escape from the high pressure of injection fluid that is being forced into the mold cavity during the course of movement of the valve pin from an upstream position downstream into a gate closed position.

FIG. 1 shows a prior art valve configuration having a nozzle insert IN and an insulation cap IC with a valve pin having a configuration where the distal tip end portion of the valve pin, when driven into the gate closed position as shown provides no relief or escape from the high pressure of injection fluid that is being forced into the mold cavity during the course of movement of the valve pin from an upstream position downstream into a gate closed position.

Figure 2:
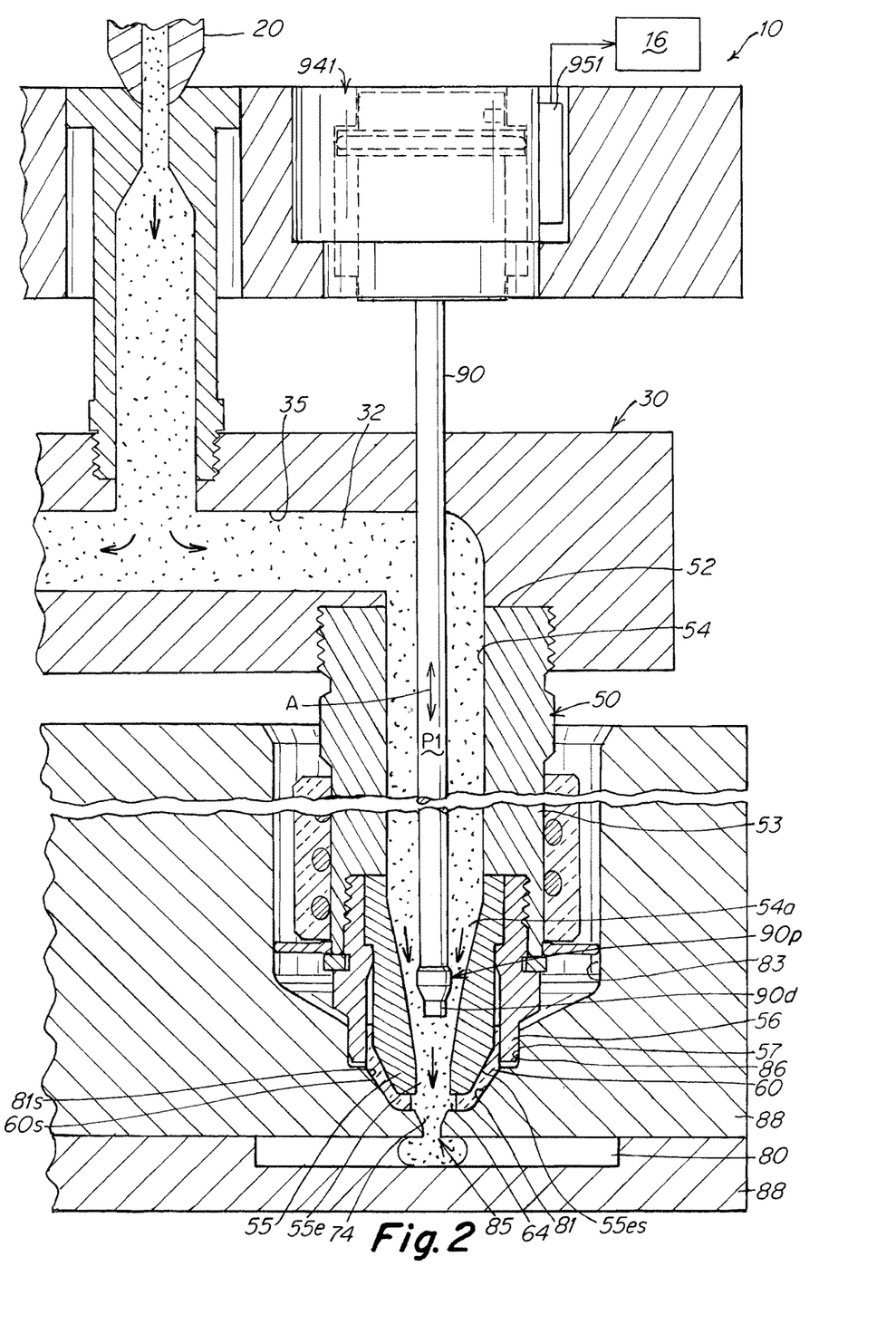
FIG. 2 is a side cross-sectional view of an embodiment of the invention showing a valve pin during the course of an injection cycle disposed at an upstream position within a flow channel within a nozzle where the gate to the mold is not obstructed by the pin and fluid injection material flows freely through the gate.

FIG. 2 shows one system embodiment 10 of the invention comprised of an injection machine 20 that feeds meltable injection material that is converted from solid form into molten or liquid flowing material form within the barrel (not shown) of the machine 20 by a screw (not shown) that drives the molten material 32 downstream under a controlled pressure into the fluid distribution channels 35 of a hotrunner or manifold 30. The molten fluid 32 is driven from the manifold channel 35 into the upstream end 52, FIGS. 3, 4 of a central flow passage or channel 54 of a nozzle 50.

The nozzle 50 is mounted within an aperture 83 provided within the mold body 88 or an intermediate plate that is mounted to the mold plate 88. The melt material 32 further flows downstream under pressure through a continuous flow channel 54, 54a, 64, 74 that extends from the upstream end 52 of the nozzle to a gate 85 of a mold cavity 80, the continuous flow channel 54, 54a, 64, 74 being collectively comprised of the upper nozzle channel 54, FIGS. 3, 4, that sealably communicates with downstream channel 54a that is disposed within a nozzle insert 55 which further communicates with a channel 64 that is formed within an insulation cap 60 that in turn sealably communicates with a downstream channel 74 formed within the body of the mold 88, the channel 74 communicating at its downstream end with the gate 85 to the cavity 80 of the mold 88.

As shown in FIGS. 2-5, the nozzle 50 itself is comprised of an outermost cylindrical nozzle tube or body 53 having a central flow channel 54, a cylindrical nozzle tip 56 that is typically screwably engaged concentrically within the downstream distal end of the outer body 53 of the nozzle 50, a cylindrical nozzle insert 55 having a flow channel 54a that is concentrically mounted within the interior circumference of the tip 56 and a cylindrical insulation cap 60 having a flow bore or exit aperture 64 that is concentrically mounted between the axially outer circumferential surface of the insert 55 and the distal-most portion of the axially inner circumferential surface of the nozzle tip 56.

The system includes a valve pin 90 interconnected at an upstream end to an actuator 941 in a conventional manner (not shown) as described and shown in, for example, U.S. Patent Application Publication No. 2012/0248644 or U.S. Patent Application Publication No. 2012/0248652 such that the actuator 941 and pin 90 move reciprocally upstream and downstream A in unison along an axial path A through the flow channel 54, 54a, 64, 74. The actuator 941 is interconnected to a controller 16 that contains an algorithm that controls the upstream-downstream velocity of movement of the pin 90 and actuator 941 along axis A between a fully gate closed, FIG. 4, and a fully upstream position. The actuator 941 can comprise a fluid driven mechanism such as a hydraulically or pneumatically driven actuator as described in for example U.S. Pat. Nos. 5,894,025, 6,464,909, 6,585,505, 8,016,581, 7,597,828 the disclosures of all of which are incorporated herein by reference as if fully set forth herein. Alternatively the actuator 941 can comprise an electrically driven motor, the shaft of which is interconnected to the valve pin as disclosed for example in U.S. Pat. No. 6,194,122 the disclosure of which is incorporated herein by reference as if fully set forth herein. The controller 16 can be adapted to controllably drive any of the hydraulic, pneumatic or electric motor actuators referenced above in order to drive the valve pin along any path of travel during the course of an injection cycle according any predetermined program, algorithm or protocol.

The outer circumferential surface 57 of the nozzle tip 56 forms a fluid seal around the gate 85 by compressed engagement with an inner circumferential surface 86 of the mold 88 thus sealing injection fluid within the central flow channel 54, 54a, 64, 74 and preventing injection fluid from seeping into the cavity or aperture 83 in which the nozzle 50 is mounted. Additionally, the outer surface 60s of the insulation cap 60 is in compressed contact with the axially inner surface 81s of the receiving or mounting aperture 81 forming a fluid seal S around the gate 85 that seals and prevents injection fluid 32 from seeping into the cavity or aperture 83 in which the nozzle 50 is mounted.

The nozzle body 53, FIGS. 2-5, is typically heated to an elevated temperature so as to maintain the injection fluid material at an elevated ready flow facilitated temperature. The insert 55 is typically mounted concentrically within the nozzle tip 56 in thermal communication with the nozzle body 53 and tip 56 and is thus in turn heated and is preferably comprised of a highly heat conductive material so as to remain heated together with the nozzle body 53 and tip 56 to maintain the injection fluid material flowing through channel 54, 54a, 64, 74 at a high flow ready temperature at or near the entry to the gate 85.

The insulation cap 60, FIGS. 2-5, is comprised of a non heat conductive or heat insulative material. The mold body 88 is cooled with water during an injection cycle and is maintained at a relatively low or cooled temperature relative to the very high temperature of the nozzle 50 and its associated components 53, 55, 56. The insulation cap 60 is mounted immediately downstream of the highly conductive insert 55 between the insert 55 and any opposing interior surface of the mold body 88 which is cool or cooled relative to the very high temperature of the nozzle 50 and its components 53, 55, 56. The insulation cap 60 thus insulates heat transfer or loss between the nozzle 50 and the mold 88.

As shown, FIGS. 2-5, the geometry or configuration of the insulation cap 60, the insert 55 and the receiving cavity or aperture 81 of the mold 88 within which the cap 60 is mounted are all adapted and configured such that an interior surface 63 of the cap 60 receives and engages a major portion of the exterior circumferential surface 55es of the highly conductive insert 55 thus facilitating and effecting prevention of heat transfer or thermal insulation between the insert 55 and the mold 88.

FIG. 2 shows the system at a point in time in an injection cycle where the valve pin 90 is disposed in an upstream, gate open position where injection fluid flow through the channel 54, 54a, 64, 74 is not restricted by the distance between an exterior circumferential surface of the pin 90 and an interior surface of the channel 54, 54a, 64, 74.

Figure 3:
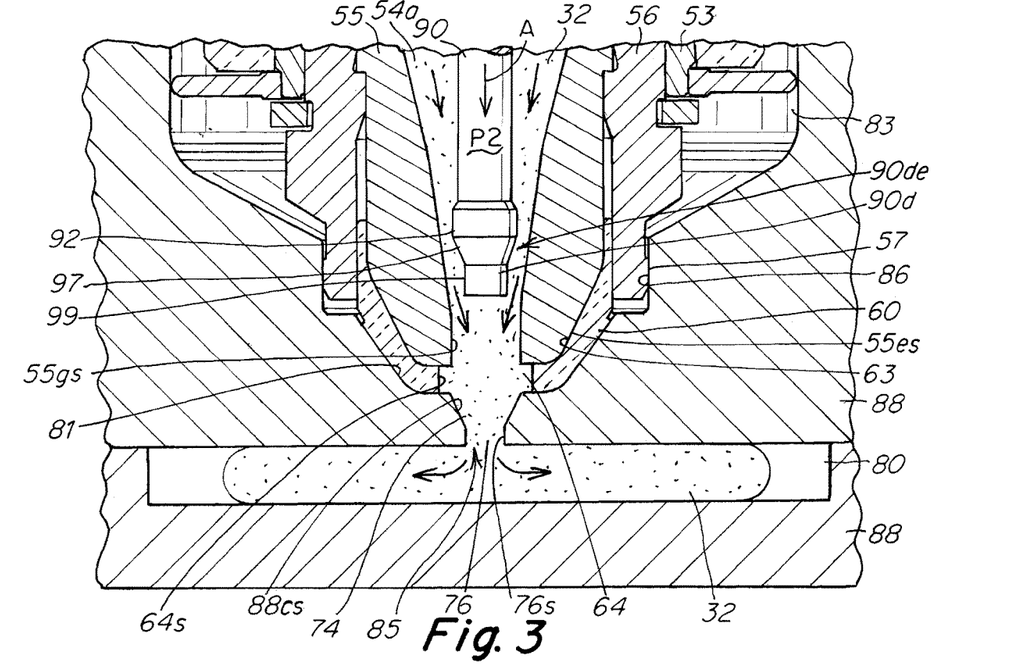
FIG. 3 is a view similar to FIG. 1 at a later time in the injection cycle where the valve pin has been driven downstream slightly to a position where the outer circumferential surface of the valve pin has come closer in distance to an inner surface of the flow channel.
Figure 4:
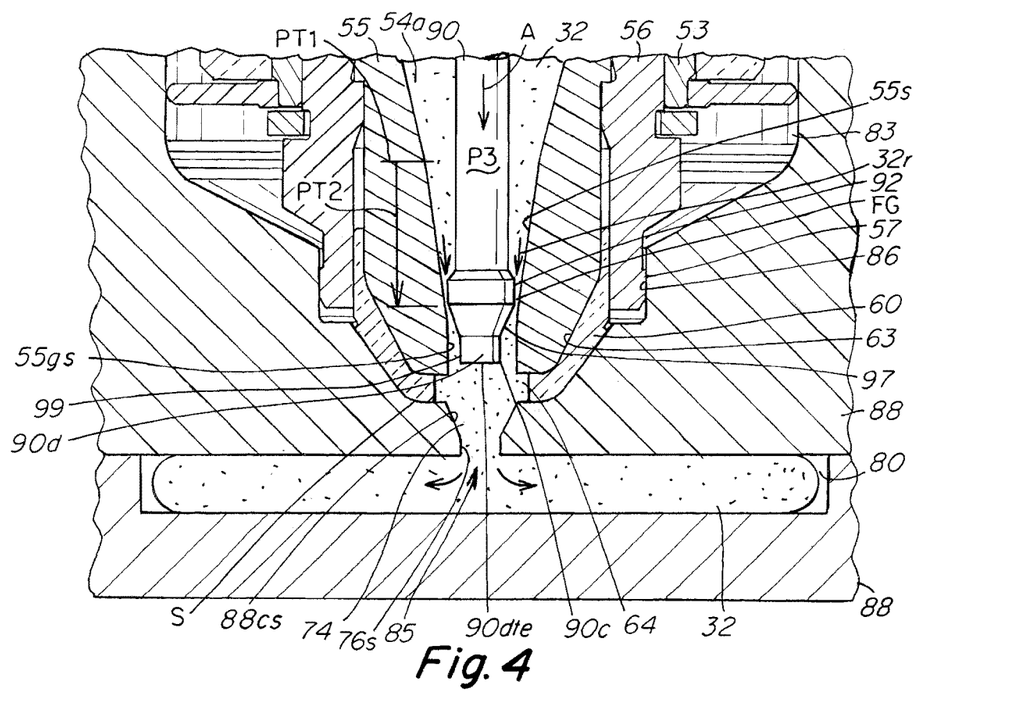
FIG. 4 is a view similar to FIGS. 1, 2 at yet a later time in the injection cycle where the valve pin has been driven downstream to a position where a selected widened and configured portion of the outer circumferential surface of the pin has almost come into contact with a complementary portion of an inner guide surface $55gs$ of the flow channel such that the axis of the pin is aligned with the gate to the mold and the distal tip end of the pin is guided in alignment toward the gate.

FIG. 3 shows the system at a point in time in an injection cycle where the pin 90 has moved downstream nearer the gate 85 relative to the position of the pin 90 in FIG. 2. As shown in FIGS. 2-5, the pin 90 has a distally disposed bulbous protrusion 90p that has a distally disposed portion of its exterior circumferential surface 92 that is formed and configured to be complementary in geometry, diameter and the like to the geometry, diameter and configuration of a complementary axially interior surface 55gs of the insert 55, the surface 55gs being formed to be complementary to the surface 92 and to slidably receive and engage surface 92 as the pin 90 axially moves A such that the axis A of the pin is guided in its movement in alignment with the gate 85 and with the flow channel 54, 54a, 64, 74 generally. FIG. 4 shows the system 10 at a point in time in an injection cycle where the pin surface 92 is immediately upstream of being received by and slidably engaging against the guide surface 55gs of the insert. In this pin position P3, a small gap FG is formed between the axially interior surface 55s, FIG. 4, where the rate of flow of injection fluid 32r is reduced relative to the rate of flow when the pin is in the positions P1 and P2 of FIGS. 2, 3 respectively. Such a reduced flow rate 32r occurs over some length of pin travel PT1 and PT2 when the circumferential surface 92 is closely adjacent, either upstream (PT1) or downstream (PT2) to or of the guide surface 55gs. When the circumferential surface 92 actually mates with the guide surface 55gs, the flow of injection fluid is essentially stopped.

Figure 5:
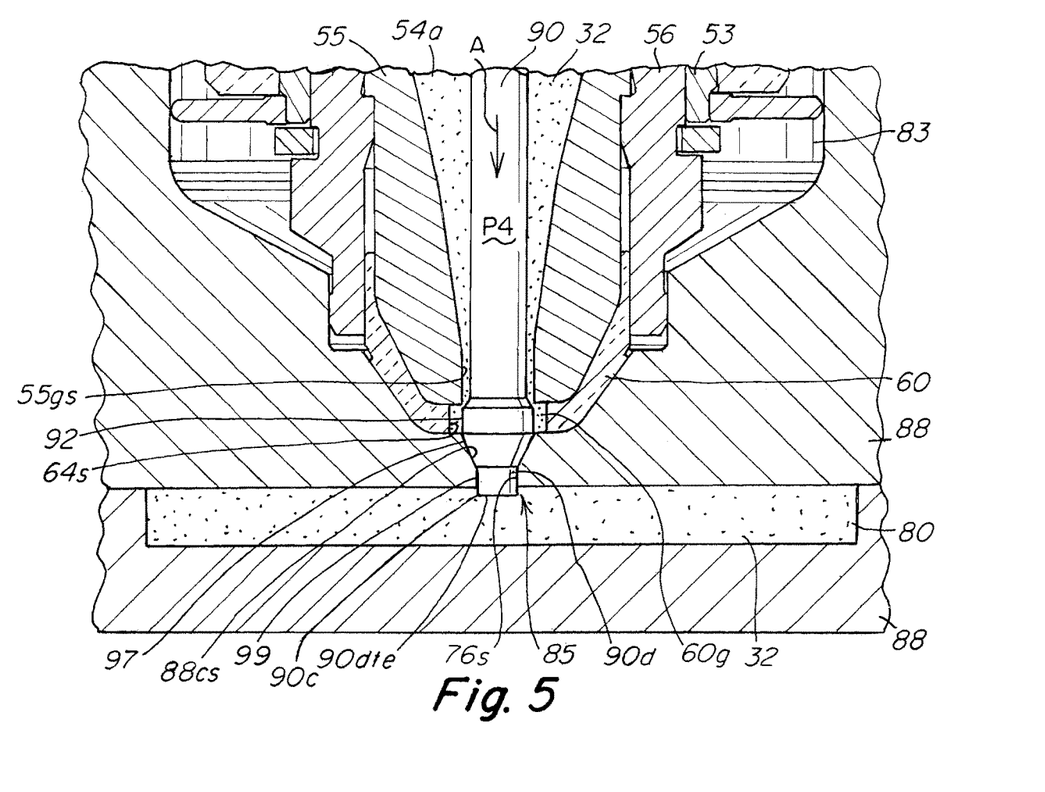
FIG. 5 is a view similar to FIGS. 2-4 at yet a later time in the injection cycle where the valve pin has been driven downstream to a gate closed position with the distal tip end of the valve pin fully inserted within and closing a complementary geometrically configured gate aperture.

FIG. 5 shows the system and the position of the pin P4 at a point in time when the pin 90 has been driven to it furthest downstream position whereby the gate 85 to the mold cavity 80 has been closed and flow of molten injection material through the channel 54, 54a, 64, 74 is stopped. As shown in FIGS. 2, 3, 4 the mold body 88 is formed having a receiving cavity or channel 74 that has an interior surface 88cs that is complementary in geometry and configuration to the preselected geometry and configuration of a distally disposed end portion of the exterior circumferential surface 97 of the pin 90. The surface 88cs is configured such that when the pin 90 is driven to its furthest downstream position shown in FIG. 5, the complementary surface 97 of the pin engages with surface 88cs to force all injection fluid material that resides in the distal portion 74 of the flow channel through the gate 85.

As shown in FIGS. 2, 3, 4, 5 the distal-most portion 90d of the pin 90 has a cylindrically shaped outer circumferential surface 99 that is complementary to an inner surface 76s of the distal-most space 76 that is immediately downstream of the flow channel 54, 54a, 64, 74 such that when the pin 90 is driven to its fully gate closed position as shown in FIG. 4, the circumferential surface 99 of portion 90d will slidably engage against surface 76s and the distal tip end surface 90dte of the pin 90 will force all injection fluid material that resides in the distal-most portion 76 of the flow channel through the gate 85. The distal-most edges or corners 90c of the distal-most portion 90d of the pin 90 are preferably sharpened such that the outer surfaces of portion 90d that mate to form the edges or corners 90c are either flat or concave. Alternatively, the bottom surface 90dte of pin 90 can be convex or have a slight outward radius rendering the corners 90c rounded or curved.

The insulation cap 60 can be adapted, formed or configured to form a sealed or enclosed circumferential gap or space 60g that surrounds the circumferential surface of the valve pin that is immediately upstream of the gate 95. Such a space 60g serves to receive upstream backflow of injection fluid that is forced into space 76 that does not readily flow through gate 85 during the course of driven downstream movement of the pin 90 into a fully gate closed position and the movement of tip end member 90d into space 76, the circumferential gap or space 60g also serving to relieve excess pressure in the injection fluid in the immediate area of the gate 85 during the course of such closure of the pin 90, such relief of excess pressure minimizing or preventing the occurrence of a visual defect or artifact in the final cooled part produced within the cavity 80. As shown, the gap 60g is formed between the axially interior surface 64s and the circumferential surface 92 of the bulbous protrusion portion 92p of the valve pin 90.

As described in detail in International Application Publication No. WO2012/074879, U.S. Patent Application Publication No. 2012/0248644, International Application Publication No. 2012/087491 and U.S. Patent Application Publication No. 2012/0248652, the disclosures of which are incorporated herein by reference, the valve pin 90 is interconnected to an actuator 941, the operation of which is controlled by an electronic controller 16 that contains an algorithm that controllably drives the valve pin 90 to selectable axial positions or at selectable velocities along the axis A of the flow channel 54, 54a, 64, 74. The system can include a position sensor 951 that detects axial position of the pin or the actuator and sends the position signal to the controller 16 which uses the position signal to cause the pin 90 to be driven to selected positions or at preselected velocities either upstream or downstream depending on the detected position of the pin 90. As described in International Application Publication No. WO2012/074879 and U.S. Patent Application Publication No. 2012/0248644, the velocity of the pin is typically withdrawn beginning from a gate closed position to a predetermined upstream position at a relatively low velocity that prevents fluid injection material from flowing through the gate 85 into the cavity 80 at a rate that will result in a visual defect, vestige or artifact occurring in the part that is ultimately produced in the mold cavity 80. Also as described in International Application Publication No. WO2012/074879 and U.S. Patent Application Publication No. 2012/0248644, the algorithm can be programmed to cause the valve pin 90 to be withdrawn upstream at a high velocity that is higher than the initial lower velocity (typically the maximum velocity at which the hydraulic, pneumatic or electric motor drive system is capable of driving the pin) when the axial position of the pin 90 or actuator 941 has been determined by the position sensor 951 to have reached an intermediate upstream position at which the valve pin 90 does not restrict the flow of injection fluid through the gate 85. Most preferably the valve pin 90 is driven continuously upstream from the gate closed position (shown in FIG. 5) to a fully upstream gate open position during the upstream withdrawal portion of an injection cycle.

As described in International Application Publication No. WO2012/074879 and U.S. Patent Application Publication No. 2012/0248644, the valve pin 90 or actuator 941 can also be controllably driven from an upstream position to the gate closed position, FIG. 5, at variably selectable velocities. Typically, the pin 90 or actuator 941 is driven from a fully upstream position to a preselected intermediate downstream position at a relatively high velocity (typically maximum velocity for the drive system) and then, when detected to be at the selected intermediate downstream position, driven at a lower selected velocity (lower than the high velocity) from the preselected intermediate downstream position to the gate closed position, the lower velocity being preselected to minimize or prevent any visual defect, vestige or artifact occurring in the part that is ultimately produced in the mold cavity 80. Most preferably the valve pin 90 or actuator 941 is driven continuously downstream during the downstream drive portion of an injection cycle.

As described in International Application No. 2012/087491 and U.S. Patent Application Publication No. 2012/0248652, the valve pin 90 and actuator 941 can alternatively be driven upstream or downstream at variably selectable velocities based on the elapse or occurrence of a predetermined amount of time without reliance on detection of axial position of the pin 90 or actuator 941 by a position sensor. As in the previously described embodiments, the valve pin 90 or actuator 941 is typically withdrawn upstream beginning from a fully start or gate closed position (FIG. 5) for a predetermined amount of time at a relatively low velocity that prevents fluid injection material from flowing through the gate 85 into the cavity 80 at a rate that will result in a visual defect, vestige or artifact occurring in the part that is ultimately produced in the mold cavity 80. The predetermined amount of upstream withdrawal time at the selected low velocity results in the pin 90 or actuator 941 being withdrawn to some predetermined intermediate upstream position that is determined by trial and error. The predetermined intermediate upstream position is preferably a position at which the valve pin 90 does not restrict the flow of injection fluid through the gate 85. upon expiration of the predetermined amount of time at which the pin is withdrawn at the initial low velocity, the algorithm is typically programmed to cause the valve pin 90 or actuator 941 to be withdrawn upstream at a high velocity that is higher than the initial lower velocity (typically the maximum velocity at which the hydraulic, pneumatic or electric motor drive system is capable of driving the pin). Most preferably the valve pin 90 is driven continuously upstream from the gate closed position (shown in FIG. 4) to a fully upstream gate open position during the upstream withdrawal portion of an injection cycle.

As described in International Application No. 2012/087491 and U.S. Patent Application Publication No. 2012/0248652, the valve pin 90 and actuator 941 can alternatively be controllably driven from an upstream position to the gate closed position, FIG. 5, at variably selectable velocities based on preselected times. Typically, the pin 90 or actuator 941 is driven from a fully upstream position at a relatively high velocity (typically maximum velocity for the drive system) for a preselected amount of time that results in the pin 90 being driven to an intermediate downstream position and then, upon expiration of the preselected amount of high velocity downstream drive time, the valve pin 90 or actuator 941 is driven at a lower selected velocity (lower than the high velocity) from the intermediate downstream position to the gate closed position, the lower velocity being preselected to minimize or prevent any visual defect, vestige or artifact occurring in the part that is ultimately produced in the mold cavity 80. Most preferably the valve pin 90 or actuator 941 is driven continuously downstream during such a downstream drive portion of an injection cycle.

What is claimed is:

1. An injection molding apparatus comprising:
    a manifold having a manifold channel that receives an injection fluid,
    a nozzle having a nozzle channel having an axis receiving the injection fluid from the manifold channel, the nozzle having a distal tip in fluid communication with a gate to a mold cavity,
    the distal tip of the nozzle being comprised of a heat conductive insert and an insulation cap that is substantially less heat conductive than the insert, mounted coaxially within the nozzle channel in nested contact with each other,
    the heat conductive insert and the insulation cap each having a downstream end portion containing a fluid exit aperture that are aligned with each other enabling flow of injection fluid through the nozzle channel downstream into the mold cavity,
    the downstream end portion of the insulation cap being disposed between the gate and the downstream end portion of the heat conductive insert forming a fluid seal around the gate,
    a valve pin interconnected to an actuator adapted for controllably driven reciprocal movement of the valve pin coaxially through the nozzle flow channel,
    the valve pin having a distal end portion having a downstream-most circumferential surface complementary to an axially interior surface of the gate and a downstream surface portion around the circumference of a bulbous portion of the valve pin immediately upstream of the downstream-most circumferential surface that mates with a guide surface of the insert to stop flow of injection fluid upstream of the axially interior surface of the gate, downstream surface portion having a gap enabling circumferential surface around the circumference of the bulbous portion of the valve pin,
    the actuator being adapted to controllably drive the distal end portion of the valve pin along a drive path extending between one or more upstream positions where the injection fluid flows through the gate and a downstream gate closed position where the distal end portion of the valve pin mates with the axially interior surface of the gate to stop flow of injection fluid through the gate,
    wherein when the valve pin is in the gate closed position, an axially interior surface of the fluid exit aperture of the insulation cap surrounds the gap enabling circumferential surface of the valve pin forming a spatial gap immediately upstream of the gate and downstream of the guide between the interior surface of the fluid exit aperture of the insulation cap and the gap enabling circumferential surface around the circumference of the bulbous portion of the valve pin.

2. The apparatus of claim 1 wherein the actuator is interconnected to a controller that controllably instructs the actuator to drive the distal end portion of the valve pin continuously upstream starting from the gate closed position at one or more intermediate upstream velocities that are less than a predetermined velocity and to subsequently further drive the valve pin upstream at the predetermined velocity.

3. The apparatus of claim 1 wherein the actuator comprises a hydraulically driven or pneumatically driven actuator or an electrically powered motor.

4. The apparatus of claim 2 wherein the actuator comprises a hydraulically driven or pneumatically driven actuator or an electrically powered motor.

5. The apparatus of claim 1 wherein the spatial gap is adapted to receive injection fluid that is forced upstream from the gate when the valve pin is moved downstream toward the gate closed position.

6. The apparatus of claim 1 wherein axially interior surface of the gate comprises a surface of the mold.

7. The apparatus of claim 1 wherein the nozzle channel has an axially interior surface disposed upstream of the fluid exit apertures that is complementary to and slidably engages with the gap enabling circumferential surface of the valve pin to align the axis of the valve pin with the gate during downstream movement of the valve pin toward the gate closed position.

8. The apparatus of claim 1 wherein an axially inner surface of an upstream end portion of the insulation cap is engaged against an axially outer surface of a downstream end of the insert, the upstream end portion of the insulation cap being compressed between the insert and an axially inner surface of the distal tip of the nozzle to seal flow of the injection fluid to within the nozzle channel.

9. The apparatus of claim 1 wherein the distal end portion of the valve pin is configured such that flow of injection fluid through the gate is restricted at one or more positions of the valve pin that are intermediate the gate closed position and a fully upstream gate open position at which flow of the injection fluid is unrestricted.

10. A method of performing an injection molding cycle comprising injecting the injection fluid from an injection molding machine into the manifold channel of the apparatus of claim 4 and using the apparatus of claim 4 to inject the injection fluid into the mold cavity during the course of an injection molding cycle.

* * * * *